United States Patent
Potkonjak et al.

(10) Patent No.: US 9,367,462 B2
(45) Date of Patent: Jun. 14, 2016

(54) SHARED MEMORIES FOR ENERGY EFFICIENT MULTI-CORE PROCESSORS

(75) Inventors: Miodrag Potkonjak, Los Angeles, CA (US); Nathan Zachary Beckmann, Cambridge, MA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 795 days.

(21) Appl. No.: 12/648,529

(22) Filed: Dec. 29, 2009

(65) Prior Publication Data

US 2011/0161586 A1 Jun. 30, 2011

(51) Int. Cl.
*G06F 12/00* (2006.01)
*G06F 12/08* (2016.01)

(52) U.S. Cl.
CPC ........... *G06F 12/084* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 6,487,675 B2 | 11/2002 | Sager et al. | |
| 7,836,116 B1* | 11/2010 | Goodnight et al. | 708/404 |
| 8,269,327 B2* | 9/2012 | Leedy | 257/678 |
| 2002/0138717 A1* | 9/2002 | Joy et al. | 712/235 |
| 2007/0038984 A1* | 2/2007 | Gschwind et al. | 717/136 |
| 2007/0136537 A1* | 6/2007 | Doblar et al. | 711/154 |
| 2007/0162726 A1* | 7/2007 | Gschwind et al. | 712/209 |
| 2008/0091922 A1* | 4/2008 | Fluhr et al. | 712/207 |
| 2008/0133883 A1 | 6/2008 | Glew | |
| 2008/0184009 A1* | 7/2008 | Hughes et al. | 712/30 |
| 2008/0281476 A1* | 11/2008 | Bose et al. | 700/300 |
| 2008/0303131 A1* | 12/2008 | McElrea et al. | 257/686 |
| 2008/0320232 A1* | 12/2008 | Vishin et al. | 711/143 |
| 2009/0094438 A1* | 4/2009 | Chakraborty et al. | 712/30 |
| 2009/0187736 A1* | 7/2009 | Raichelgauz et al. | 712/36 |
| 2011/0078412 A1* | 3/2011 | Emma et al. | 712/30 |

FOREIGN PATENT DOCUMENTS

| | | |
|---|---|---|
| JP | H02-301830 | 12/1990 |
| JP | 2934003 | 4/1992 |
| JP | H04-290128 | 10/1992 |
| JP | H06-222920 | 8/1994 |
| JP | H07-152648 A | 6/1995 |
| JP | H08-137749 | 5/1996 |
| JP | H04-123230 A | 5/1999 |
| JP | H11-212786 | 8/1999 |
| JP | 2001167066 | 6/2001 |

(Continued)

OTHER PUBLICATIONS

Bryan Black et al., "Die Stacking (3d) Microarchitecture", Dec. 2006, pp. 1-11.*

(Continued)

*Primary Examiner* — Charles Rones
*Assistant Examiner* — Matthew Chrzanowski
(74) *Attorney, Agent, or Firm* — Turk IP Law, LLC

(57) ABSTRACT

Technologies are described herein related to multi-core processors that are adapted to share processor resources. An example multi-core processor can include a plurality of processor cores. The multi-core processor further can include a shared register file selectively coupled to two or more of the plurality of processor cores, where the shared register file is adapted to serve as a shared resource among the selected processor cores.

14 Claims, 9 Drawing Sheets

(56) References Cited

FOREIGN PATENT DOCUMENTS

| | | |
|---|---|---|
| JP | 2002-373115 | 12/2002 |
| JP | 2004-525468 | 8/2004 |
| JP | 2005-507115 A | 3/2005 |
| JP | 2005-522758 A | 7/2005 |
| JP | 2006-003949 | 1/2006 |
| JP | 2006-509290 | 3/2006 |
| JP | 2007-048286 A | 2/2007 |
| JP | 2007-531167 | 11/2007 |
| JP | 2008-539472 A | 11/2008 |
| JP | 2009-199384 A | 9/2009 |
| JP | 2009-246246 A | 10/2009 |
| JP | 2009-251997 | 10/2009 |
| JP | 2010-134698 | 6/2010 |
| JP | 2010134698 | 6/2010 |
| WO | WO 0152060 | 7/2001 |
| WO | WO 2009055018 A1 | 4/2009 |
| WO | WO 2009142930 | 11/2009 |
| WO | WO 2010032729 | 3/2010 |
| WO | WO 2011033601 | 3/2011 |

OTHER PUBLICATIONS

International Search Report and Written Opinion dated Dec. 19, 2011 in PCT/US2010/061766.
Kumar et al., "Single-ISA Heterogeneous Multi-Core Architectures: The Potential for Processor Power Reduction," In: Proceedings of the 36th International Symposium on Microarchitecture, Dec. 2003.
Bernstein, Kerry, et al., "Interconnects in the third dimension: design challenges for 3D ICs", Jun. 4-8, 2007, Proceedings of the 44th annual conference on Design automation; Abstract, 1 page.
Chiang. T.Y., et al., "Thermal Analysis of Heterogeneous 3-D ICs with Various Integration Scenarios", Dec. 2001, IEEE International Electron Devices Meeting (IEDM) 2001 Technical Digest, pp. 681-684; 4 pages.
Cong, Jason, et al., "An automated design flow for 3D microarchitecture evalulation", Jan. 2006, Proceedings of the 2006 Asia and South Pacific Design Automation Conference; Abstract, 1 page.
Das, Shamik, et al., "Design tools for 3-D integrated circuits", Jan. 2003, Proceedings of the 2003 Asia and South Pacific Design Automation Conference; Abstract, 1 page.
Dong, Xiangyu, et al., "Circuit and microarchitecture evaluation of 3D stacking magnetic RAM (MRAM) as a universal memory replacement", Jun. 2008, Proceedings of the 45th annual conference on Design automation; Abstract, 1 page.
Kumar, Rakesh, et al., "Processor power reduction via single-ISA heterogeneous multi-core architectures", 2003, Computer Architecture Letters; 4 pages.
Li, Feihui et al., "Design and Management of 3D Chip Multiprocessors Using Network-in-Memory", May 2006, ACM SIGARCH Computer Architecture News, v.34 n.2, pp. 130-141; 12 pages.
Mysore, Shashidhar, et al., "Introspective 3D chips", Oct. 2006, Proceedings of the 12th international conference on Architectural support for programming languages and operating systems; 10 pages.
Puttaswamy, Kiran, et al., "Implementing Register Files for High-Performance Microprocessors in a Die-Stacked (3D) Technology", Mar. 2-3, 2006, Proceedings of the IEEE Computer Society Annual Symopsium on Emerging VLSI Technologies and Architectures; Abstract, 1 page.
Wang, Ting-Yuan, et al., "3D thermal-ADI: an efficient chip-level transient thermal simulator", Apr. 2003, Proceedings of the 2003 international symposium on Physical design; 8 pages.
Agarwal, K.; et al., "Power gating with multiple sleep modes," Mar. 27-29, 2006, 7th International Symposium on Quality Electronic Design, 2006, vol. 5; 5 pages.
Annavaram, M.; et al., "Mitigating Amdahl's law through EPI throttling", Jun. 2005, Proceedings of the 32nd International Symposium on Computer Architecture; 12 pages.

Banerjee, K., et al., "3-D ICs: A Novel Chip Design for Improving Deep-Submicrometer Interconnect Performance and Systems-on-Chip Integration", May 2001, Proceedings of the IEEE, 89(5); 32 pages.
Black, Bryan, et al., "Die Stacking (3D) Microarchitecture", Dec. 2006, Proceedings of the 39th Annual IEEE/ACM International Symposium on Microarchitecture; 11 pages.
Black, Bryan, et al., "3D Processing Technology and Its Impact on iA32 Microprocessors", Oct. 11-13, 2004, Proceedings of the IEEE International Conference on Computer Design 2004; 3 pages.
Cong, J., et al., "A thermal-driven floorplanning algorithm for 3D ICs", Nov. 2004, Proceedings of the 2004 IEEE/ACM International conference on Computer-aided design; 8 pages.
Goplen, Brent, et al., "Efficient Thermal Placement of Standard Cells in 3D ICs using a Force Directed Approach", Nov. 9-13, 2003, Proceedings of the 2003 IEEE/ACM international conference on Computer-aided design; 4 pages.
Grochowski, E.;et al., "Best of both latency and throughput," Oct. 11-13, 2004, Proceedings of the IEEE International Conference on Computer Design: VLSI in Computers and Processors 2004; 8 pages.
Kgil, Taeho, et al., "PicoServer: using 3D stacking technology to enable a compact energy efficient chip multiprocessor", Oct. 2006, Proceedings of the 12th international conference on Architectural support for programming languages and operating systems, 41(11): 117-128; 12 pages.
Kumar, R., et al., "Core architecture optimization for heterogeneous chip multiprocessors", Sep. 16-20, 2006, Proceedings of the 15th international Conference on Parallel Architectures and Compilation Techniques; 10 pages.
Loh, Gabriel H., "A modular 3D processor for flexible product design and technology migration", May 2008, Proceedings of the 2008 conference on Computing frontiers; 12 pages.
Ma, Yuchun, et al., "Investigating the effects of fine-grain three-dimensional integration on microarchitecture design", Oct. 2008, ACM Journal on Emerging Technologies in Computing Systems (JETC), 4(4); 30 pages.
Martin, S.M., et al., "Combined dynamic voltage scaling and adaptive body biasing for lower power microprocessors under dynamic workloads", Nov. 10-14, 2002, Proceedings of the 2002 IEEE/ACM international conference on Computer-aided design, p. 721-725; 5 pages.
Puttaswamy, Kiran, et al., "Implementing Caches in a 3D Technology for High Performance Processors", Oct. 2005, Proceedings of the 2005 International Conference on Computer Design; 8 pages.
Xie, Yuan et al., "Design space exploration for 3D architectures" Apr. 2006, ACM Journal on Emerging Technologies in Computing Systems (JETC), 2(2):65-103; 39 pages.
Jung, S. M., et al. "The revolutionary and truly 3-dimentional 25F2 SRAM technology with the smallest S3 cell, 0.16um2 and SSTFF for ultra high density SRAM" Jun. 15-17, 2004, Symposium on VLSI Technology 2004, Digest of Technical Papers, pp. 228-229; 2 pages.
Tong, Chao Chi, et al., "Routing in a Three-Dimensional Chip", Jan. 1995, IEEE Transactions on Computers, 44 (1):106-117; 12 pages.
Tsui, Y., et al., "Three-Dimensional Packaging for Multi-Chip Module with Through-the-Silicon Via Hole", Dec. 10-12, 2003, Electronics Packaging Technology, 5th Conference (EPTC 2003), pp. 1-7; 7 pages.
Shigenobu Iwashita, Hiroshi Miyashita, Kazuaki Murakami "PPRAM: A 21st Century's Microprocessor Architecture," (Aug. 23, 1995) pp. 1-8.
Hideyuki Shimonishi, Tutomu Murase "Programmable Engine Architecture for high-speed Network Processing" (Dec. 19, 1999) pp. 31-36.
Japanese Official Action dated Dec. 19, 2013 in Japanese Application No. 2012-546192.
Amano, A Project on Dynamically Reconfigurable Processors; MuCCRA-Design Environment, Low Power Design and 3D Wireless Interconnect.
Shindou, Ray Tracing Technique Revised by Making it in Real Time.
Tomita, Past, Present and Future of the Calculator Architecture.
Zhu et al., "Three-Dimensional Chip-Multiprocessor Run-Time Thermal Management." IEEE transactions on Computer-Aided Design of Integrated Circuits and Systems, Sep. 27, 2008.

(56) References Cited

OTHER PUBLICATIONS

Accessed from http://ieeexplore.ieee.org/xpls/abs_all.jsp?arnumber=4527121 accessed on Jul. 9, 2015, pp. 1479-1492.
Karim et al., "A multilevel computing architecture for embedded multimedia applications." IEEE Micro, May-Jun. 2004, pp. 56-66. accessed from http://ieeexplore.ieee.org/xpls/abs_all.jsp?arnumber=1310266.
Li et al., "Design and Management of 3D Chip Multiprocessors Using Network-in Memory." Proceedings of the 33rd Annual International Symposium on Computer Architecture. Washington, DC, USA: IEEE Computer Society, Jun. 2006, pp. 130-141. http://dx.doi.org/10.1109/ISCA.2006.
Loh et al., "Processor Design in 3D Die-Stacking Technologies." IEEE Micro, May-Jun. 2007,pp. 31-48. Accessed from http://ieeexplore.ieee.org/xpls/abs_all.jsp?arnumber=42920055.
Rangan et al.,"Thread Motion: Fine-grained Power Management for Multi-core Systems." SIGARCH Comput. Archit. News, 37, Jun. 2009, pp. 302-313. http://doi.acm.org/10.1145/1555754.1555793.
Zeng F. , et. al. ,"Third type interconnection architecture for the 3DMP-SoC design." 7th International Conference on ASIC, Oct. 2007, pp. 902-905.http://ieeexplore.ieee.org/xpl/articleDetails.jsp?arnumber=4415777.
Madan et al., "Optimizing Communication and Capacity in a 3D Stacked Reconfigurable Cache Hierarchy", IEEE 15th International Symposium on High Performance Computer Architecture, HPCA 2009, pp. 262-274, Feb. 14-18, 2009.
"Three-dimensional integrated circuit", Wikipedia, the free encyclopedia, retrieved on Feb. 4, 2015, 5 pages.
"Cache coherence", Wikipedia, the free encyclopedia, retrieved on Feb. 4, 2015, 4 pages.
Bose, "Power-Aware Microarchitectures: Design, Modeling and Metrics", Hot Chips: A Symposium on High Performance Chips, Aug. 14, 2005, 119 pages.
"Multi-core processor", Wikipedia, the free encyclopedia, retrieved on Feb. 4, 2015, 2 pages.
Foreign Office Action received for DE 112010005041.4, mailed on Jan. 27, 2015, with English Abstract, 10 pages.
Bruce Guenin, "When Moore Is Less: Exploring the 3rd Dimension in IC Packaging," Electronics Cooling, Feb. 2009, 6 pages, http://www.electronics-cooling.com/2009/02/when-moore-is-less-exploring-the-3rd-dimension-in-ic-packaging/.
Fantai et al. "Third Type Interconnection Architecture for the 3D MP-SoC Design," 7th International Conference on ASIC, IEEE, Oct. 2007, pp. 902-905.
Kumar et al. "Heterogeneous Chip Multiprocessors." Computer, IEEE Computer Society, pp. 32-38 Nov. 2005.
Kumar et al. "Single-ISA Heterogeneous Multi-Core Architechtures: The Potential for Processor Power Reduction." Proceedings of the 36th International Symposium of Microarchitecture, IEEE Computer Society, Dec. 2003, San Diego, CA, USA, 12 pages.
Loh et al. "Processor Design in 3D Die-Stacking Technologies," IEEE Micro, IEEE Computer Society, May-Jun. 2007, pp. 31-48.
Rakesh Kumar, "Holistic Design for Multi-core Architectures" Dissertation in Computer Science, University of California San Diego 2006, 214 pages.
Swaminathan et al. "Interconnect Design and Modeling for 3D Integration." Interconnect and Packaging Center, Georgia Institute of Technology, Jun. 2009, 40 pages.
Zheng et al. "3D Stacked Package Technology and Its Applications Prospects" 2009 International Conference on New Trends in Information and Service Science. Jul. 2, 2009, pp. 528-533.

\* cited by examiner

SHARED MEMORIES FOR ENERGY EFFICIENT MULTI-CORE PROCESSORS

BACKGROUND

Unless otherwise indicated herein, the materials described in this section are not prior art to the claims in this application and are not admitted to be prior art by inclusion in this section.

A heterogeneous multi-core processor may refer to a multi-core processor having different processor cores. By splitting a workload between these different processor cores, the heterogeneous multi-core processor can provide increases in performance and/or improved energy efficiency over a homogeneous multi-core processor having duplicate generic processor cores.

Multiple processor cores within the heterogeneous multi-core processor may be utilized to execute a task. When a first processor core completes its operation and transfers execution of the task to a second processor core, the second processor core can undergo a context switch to transition from its current task to the transferred task. In order to complete the context switch, the first processor core may copy a process state of the transferred task to the second processor core. When the second processor core begins its operation, the second processor core may utilize the process state in order to resume execution of the transferred task. Copying the process state of a task from the first processor core to the second processor core can create significant overhead.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
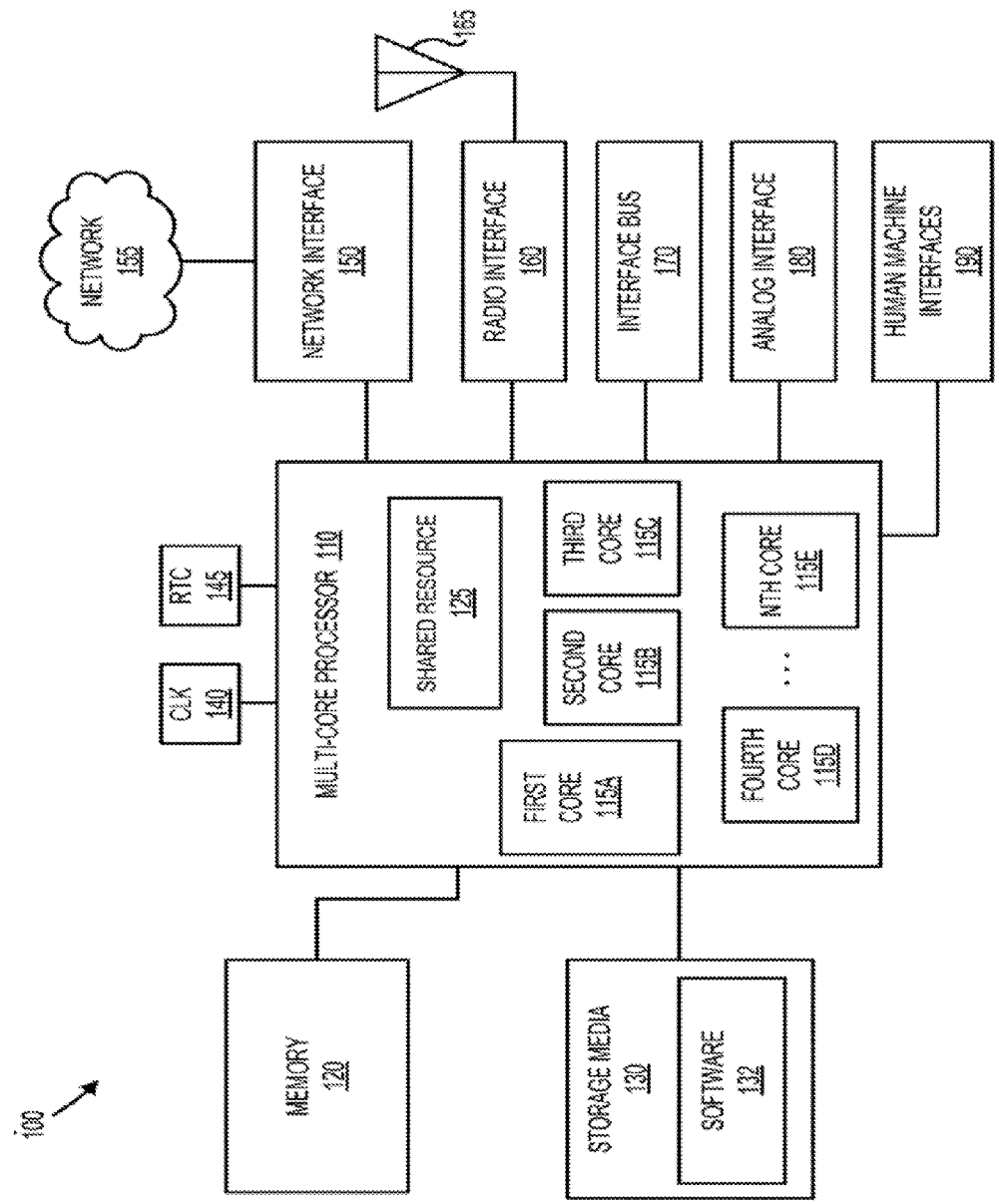
FIG. 1 is a functional block diagram illustrating an operating environment for a multi-core processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to architectures for shared register files and/or shared caches in a multi-core processor. The multi-core processor may include homogenous processor cores or heterogeneous processor cores. One or more shared register files and one or more caches may be integrated into a three-dimensional integrated circuit where each layer of the three-dimensional integrated circuit can include a different processor core. In some embodiments, one register file and/or one cache may be shared between the heterogeneous processor cores. In some other embodiments, multiple register files and/or multiple caches may be multiplexed and shared between the heterogeneous processor cores. The shared register file and/or the shared caches can be adapted to serve as a shared resource among the processor cores.

Turning now to FIG. 1, a functional block diagram 100 illustrates an operating environment for a multi-core processor 110 arranged according to at least some embodiments presented herein. A multi-core processor 110 can incorporate multiple internal processor cores such as first processor core 115A, a second processor core 115B, a third processor core 115C, a fourth processor core 115D, and an Nth processor core 115E. These may be referred to collectively, or generally, as processor cores 115. The processor cores 115 can generally be adapted to support parallel processing, parallel tasks, parallel threads, separate sequential processes, or any combination thereof.

The multi-core processor 110 may be a homogenous or heterogeneous multi-core processor. In a heterogeneous multi-core processor, two or more of the processor cores 115 may be different in one or more ways. In some implementations, two or more of the processor cores 115 may have different sizes and/or complexity. For example, the first processor core 115A may have a larger die-area, higher throughput, and higher power consumption than the second processor core 115B. In other implementations, two or more of the processor cores 115 may be different types of processor cores. For example, the third processor core 115C may be a general-purpose processor core such as a central processing unit, while the fourth processor core 115D may be an application-specific processor core such as a graphics processing unit.

In yet other implementations, two or more of the processor cores 115 may have different sizes and may be different types. The various processor cores 115 may also operate at different power states, such as different clock frequencies and different voltage levels. In some embodiments, as described in greater detail below, the processor cores 115 may be configured in a three-dimensional arrangement, such as within a three-dimensional integrated circuit. Examples of the multi-core processor 110 may include multi-core processors 200, 300, 400, 500, and/or 600 as described in greater detail below.

The multi-core processor 110 may further include a shared resource 125 that is shared by the processor cores 115. In some embodiments, the shared resource 125 may be a shared register file and/or a shared cache. In some other embodiments, the shared resource 125 may be multiple shared register files and/or multiple shared caches. Various implementations of the shared resource 125 are described in greater detail below.

A memory 120 may be adapted for access by the multi-core processor 110. The multi-core processor 110 can be configured to read from and/or write to the memory 120. Such read and write operations may relate to both instructions and data associated with operations of the multiple cores of the multi-core processor 110. Generally, each of the processor cores within the multi-core processor 110 may be configured to individually access the memory 120. The memory 120 may be random access memory ("RAM"), static RAM ("SRAM"), dynamic RAM ("DRAM"), synchronous dynamic RAM ("SDRAM"), or any other type of volatile or non-volatile memory.

Instructions and data associated with operations on the multiple processor cores 115 of the multi-core processor 110 may be stored on one or more storage media device(s) 130, which may be referred to herein collectively as computer-readable media. The storage media device 130 may support the nonvolatile storage of information. The storage media device 130 may be adapted for access by the multiple processor cores within the multi-core processor 110. The storage media device 130 can be configured to store software 132 for execution on the multiple processor cores 115 within the multi-core processor 110.

By way of example and not limitation, computer-readable media may comprise computer storage media and communication media. Computer storage media may include volatile, non-volatile, removable, and non-removable media implemented in any method or technology for the storage of information such as computer-readable instructions, data structures, program modules, or other data. Computer storage media may include, but is not limited to, RAM, read only memory ("ROM"), erasable programmable read only memory ("EPROM"), electrically EPROM ("EEPROM"), flash memory, other solid state memory technology, compact disc ROM ("CD-ROM"), digital versatile disc ("DVD"), high definition DVD ("HD-DVD"), BLU-RAY, other optical storage, magnetic cassettes, magnetic tape, magnetic disk storage such as a hard disk drive ("HDD"), other magnetic storage devices, or any other medium which can be used to store the desired information and which can be accessed by the multi-core processor 110.

An external clock ("CLK") 140 can provide a clock signal to the multi-core processor 110. CLK 140 may include a crystal oscillator or any other clock or oscillator source (not shown). CLK 140 may include a clock driver circuit (not shown). The clock signal associated with CLK 140 may be used to time and synchronize various circuits within the multi-core processor 110. The multi-core processor 110 may also interface to a real time clock ("RTC") 145. The RTC 145 can be to maintain time, such as time of day, day of week, calendar date, year, and so forth.

A network interface 150 may be adapted to logically attach the system to a network 155. A radio interface 160 may be configured to use an antenna 165 to send and/or receive wireless data packets to a wireless network or a mobile communications system. One or more interface buses 170 may also be adapted to interface to the multi-core processor 110. Examples of interface buses can include an Industry Standard Architecture ("ISA") bus, a Peripheral Component Interconnect ("PCI") bus, a PCI-Express bus, an Accelerated Graphics Port ("AGP") bus, a Universal Serial Bus ("USB"), an Advanced Technology Attachment ("ATA") bus, a Serial ATA ("SATA") bus, a Small Computer System Interface ("SCSI"), and other such buses and interfaces used in computers and embedded processor systems. Analog interfaces 180 may be coupled to the multi-core processor 110. The analog interfaces 180 may include digital-to-analog converters ("DACs"), analog-to-digital converters ("ADCs"), or both. The analog interfaces 180 may be used for video signals, audio signals, infrared signals, radio frequency ("RF") signals, sensor signals, or any other type of analog signal.

One or more human-machine interfaces 190 may also be coupled to the multi-core processor 110. Human-machine interfaces 190 may include video displays, keyboards, mice, light pens, projectors, speech recognition, switches, buttons, indicators, or any other mechanisms for receiving input from a human or providing output to a human.

It should be appreciated that the block diagram 100 of FIG. 1 is simplified and that one or more of the components shown coupled to the multi-core processor 110 may not be directly coupled to the multi-core processor 110. In particular, various types of intermediate circuitry may be utilized to couple one or components to the multi-core processor 110.

Figure 2:
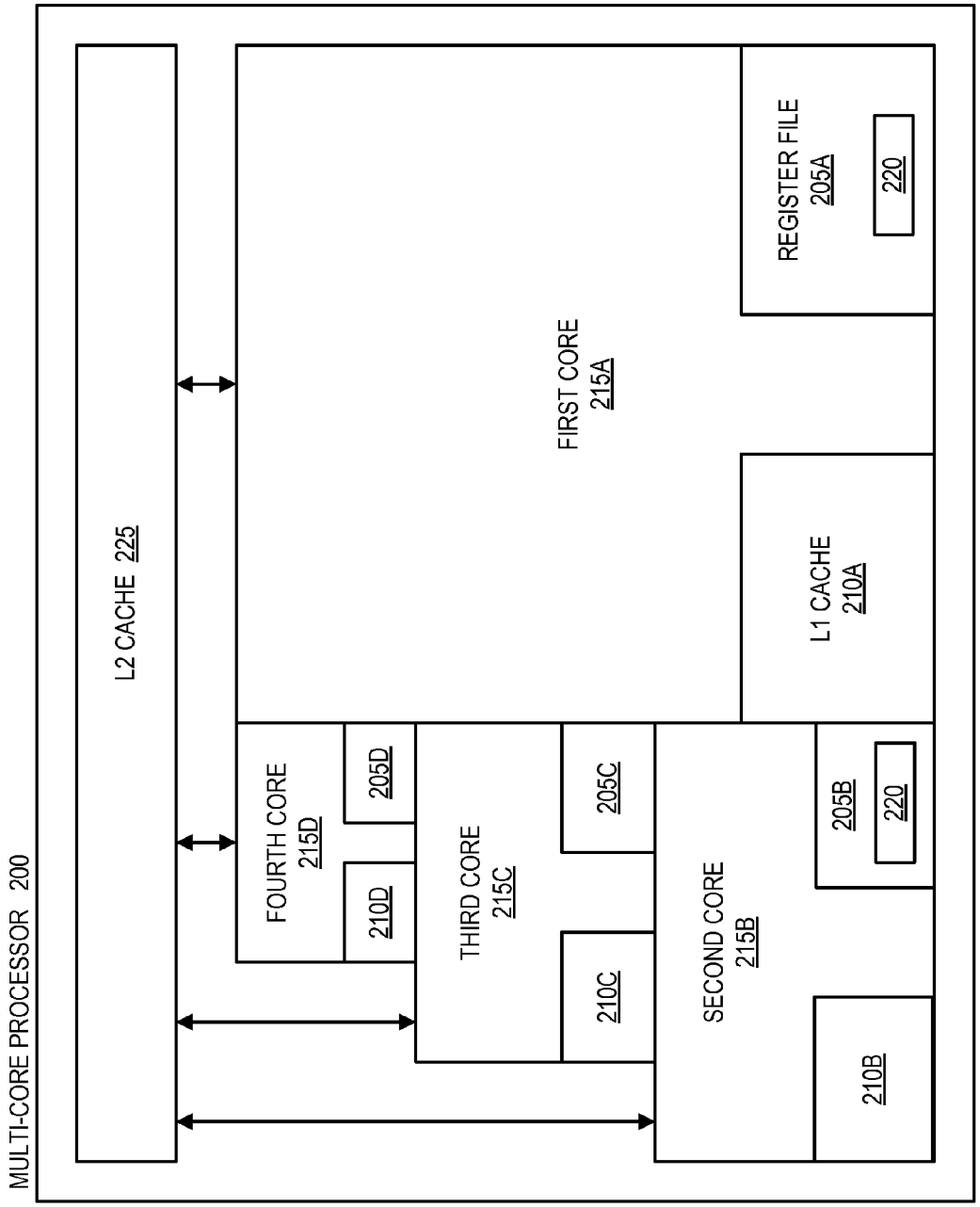
FIG. 2 is a block diagram illustrating the multi-core processor having multiple processor cores.

Turning now to FIG. 2, a block diagram illustrates a multi-core processor 200 having multiple processor cores 215 and multiple register files 205, arranged according to at least some embodiments presented herein. The example multi-core processor 200 includes a first processor core 215A, a second processor core 215B, a third processor core 215C, and a fourth processor core 215D. The processor cores 215A-215D may be referred to collectively, or generally, as processor cores 215. Although four processor cores are illustrated in FIG. 2, it should be appreciated that the multi-core processor 200 may include any suitable number of processor cores. As illustrated in FIG. 2, the processor cores 215 can be configured in a horizontal arrangement on the multi-core processor 200. That is, the processor cores 215 can be configured on a single layer on the multi-core processor 200.

The first processor core 215A may have a larger die-area, higher throughput, and/or higher power consumption than the second processor core 215B. The second processor core 215B may have a larger die-area, higher throughput, and/or higher power consumption than the third processor core 215C. The third processor core 215C may have a larger die-area, higher throughput, and/or higher power consumption than the fourth processor core 215D. In other embodiments, two or more of the processor cores 215 may be the same size. In yet other embodiments, two or more of the processor cores 215 may be different types (e.g., general purpose processors vs. special purpose processors, etc.).

The first processor core 215A may include a first associated register file 205A and/or a first associated L1 cache 210A. The second processor core 215B may include a second associated register file 205B and/or a second associated L1 cache 210B. The third processor core 215C may include a third associated register file 205C and/or a third associated L1 cache 210C. The fourth processor core 215D may include a fourth associated register file 205D and/or a fourth associated L1 cache 210D. The processor cores 215 can also be coupled to a shared L2 cache 225. The register files 205A-205D may be referred to collectively, or generally, as register files 205. The L1 caches 210A-210D may be referred to collectively, or generally, as L1 caches 210.

Two or more of the processor cores 215 in the multi-core processor 200 may be utilized to execute a task. For example, the first processor core 215A may complete execution of various operations for a task and transfer execution of the task to the second processor core 215B. The second processor core 215B can undergo a context switch to transition from a current task to the transferred task. In particular, the first processor core 215A may be configured to copy a process state 220 of the transferred task from the first register file 205A to the second register file 205B. As used herein, the process state of a task may refer to the state of relevant variables (e.g., register values, program counter values, etc.) at a given point during execution of the task. By saving the process state of a task and later resuming the task through the process state, the task can be correctly continued without knowledge of previous execution of the task. When the second processor core 215B begins operation on the transferred task, the second processor core 215B may be adapted to utilize the process state 220 in order to resume execution of the transferred task. However, copying the process state 220 from the first register file 205A to the second register file 205B may require a significant overhead.

One approach to addressing the overhead caused by copying the process state 220 from the first register file 205A to the second register file 205B is to replace the individual register files 205 with a shared register file (e.g., a register file that is shared by the processor cores 215). However, when processor cores are configured in a horizontal arrangement, a shared register file may be suboptimal because space limitations on the multi-core processor 200 may increase the distance between the shared register file and at least some of the processor cores 215 such that the performance and speed of the shared register file may be less than the performance and speed of the individual register files 205. Because registers are typically designed to provide very fast memory access, a design that reduces the performance and speed of registers may be untenable.

Figure 3:
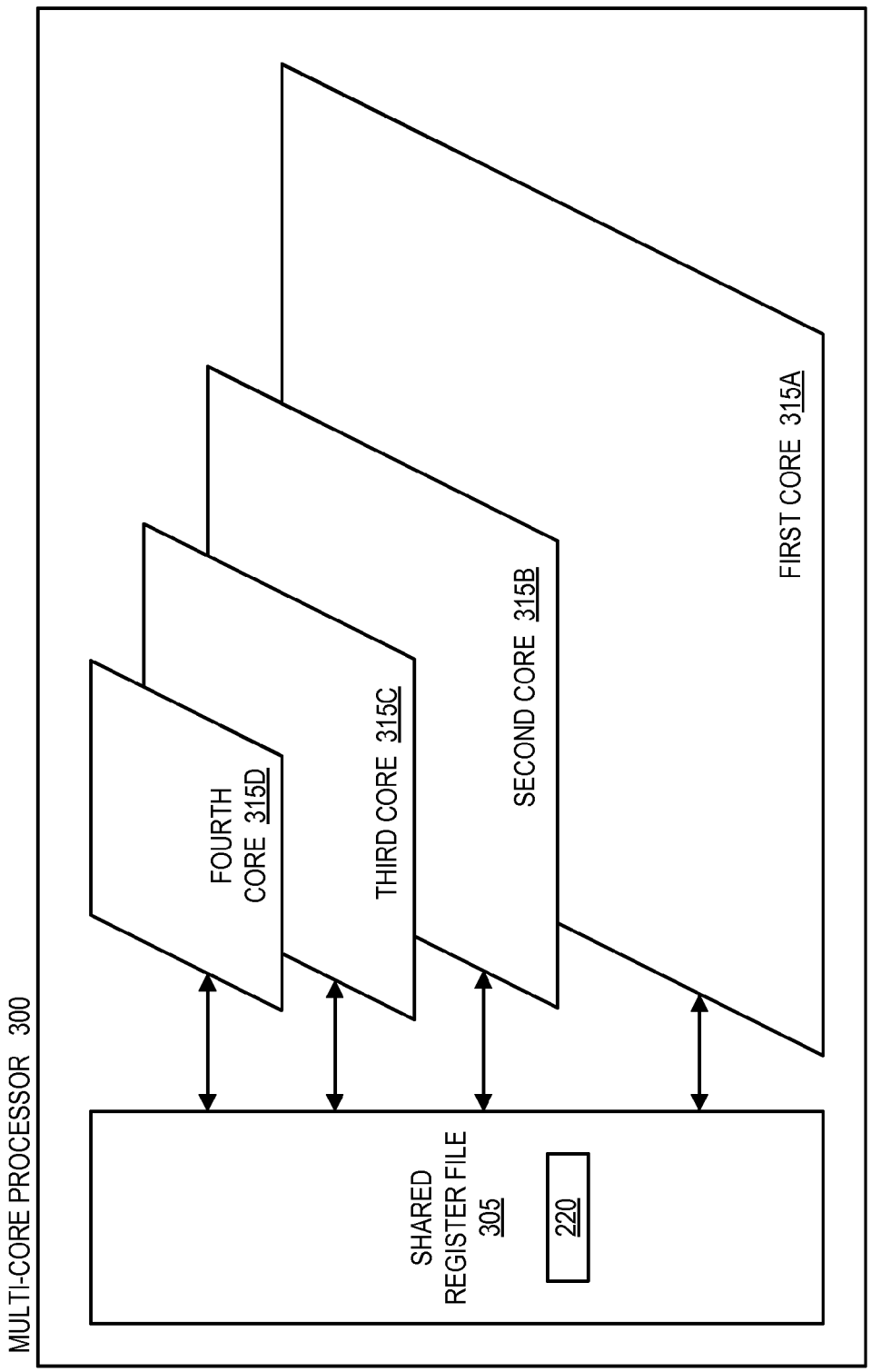
FIG. 3 is a block diagram illustrating the multi-core processor having a shared register file.

Turning now to FIG. 3, a block diagram illustrates the multi-core processor 300 having a shared register file 305 arranged in accordance with at least some embodiments presented herein. The example multi-core processor 300 includes a first processor core 315A, a second processor core 315B, a third processor core 315C, and a fourth processor core 315D. The processor cores 315A-315D may be referred to collectively, or generally, as processor cores 315. Although four processor cores are illustrated in FIG. 3, it should be appreciated that the multi-core processor 300 may include any suitable number of processors.

The first processor core 315A may have a larger die-area, higher throughput, and/or higher power consumption than the second processor core 315B. The second processor core 315B may have a larger die-area, higher throughput, and/or higher power consumption than the third processor core 315C. The third processor core 315C may have a larger die-area, higher throughput, and/or higher power consumption than the fourth processor core 315D. In other embodiments, two or more of the processor cores 315 may be the same size. In yet other embodiments, two or more of the processor cores 315 may be different types.

In some embodiments, the processor cores 315 may be configured in a three-dimensional arrangement, such as within a three-dimensional integrated circuit. In such a three-dimensional arrangement, the processor cores 315 may be configured in a vertical arrangement having multiple layers. For example, as illustrated in FIG. 3, the first processor core 315A can be configured as a first layer in the vertical arrangement. The second processor core 315B can be configured above the first processor core 315A as the second layer in the vertical arrangement. The third processor core 315C can be configured above the second processor core 315B as the third layer in the vertical arrangement. The fourth processor core 315D can be configured above the third processor core 315C as the fourth layer in the vertical arrangement.

By configuring the processor cores 315 in a vertical arrangement, additional components can be configured in close proximity to each of the processor cores 315. For example, a shared register file 305 may be configured in close proximity to the processor cores 315. By configuring the shared register file 305 in close proximity to the processor cores 315, the shared register file 305 can operate with similar performance and speed to the individual register files 205. As such, the shared register file 305 can replace the individual register files 205.

The specific configuration and positioning of the shared register file 305 with respect to the processor cores 315 may depend on at least one or more of the following factors: (1) implementation platform, (2) properties of the applications, and/or (3) primary design objectives. Examples of an implementation platform may include a single integrated circuit, a three-dimensional stack of integrated circuits, and the like. Examples of properties of the applications may include whether an application utilizes a large or small working set, whether the application is mobile or suitable for execution in a data center, whether the application is executed in real-time or best-effort, and the like. Examples of design objectives include high-speed of execution, low energy or power utilization, efficient thermal management, low-cost implementation, and the like. In a first illustrative implementation, if a high-speed of execution is a primary design objective, then the shared register file 305 (and other memory) can be placed in the middle of the three-dimensional stack of integrated circuits. By positioning the shared register file 305 in the middle of the three-dimensional stack of integrated circuits, distance between the shared register file 305 and the farthest processor cores can be minimized. Also, larger and faster processor cores may be placed near the shared register file 305. In a second illustrative implementation, if efficient thermal management is a primary design objective, then the shared register file 305 (and other memory) can be placed toward the boundary of the three-dimensional stack of integrated circuits. Also, larger and faster processor cores may be placed near the boundary of the three-dimensional stack of integrated circuits. In a third illustrative example, if low energy consumption is a primary design objective, then more active processor cores can be placed next to the shared register file 305 (and other memory), and the shared register file 305 (and other memory) can be placed near the middle of the three-dimensional stack of integrated circuits. In a fourth illustrative example, in a single planar integrated circuit where thermal management is a primary design objective, more active processor cores can be placed far from each other on the boundary of the single integrated circuit. In a fifth illustrative example, in a single planar integrated circuit where high-speed of execution is a primary design objective, joint memory and faster processor cores can be placed in the middle of the single integrated circuit and near each other.

Through the implementation of the shared register file 305, the processor cores 315 can be adapted to share the process state 220 of a task without copying the process state 220 between the individual register files 205. For example, when the first processor core 315A completes execution of operations associated with a task and transfers execution of the task to the second processor core 315B, the second processor core 315B can undergo a context switch to transition from a current task to the transferred task. In order to complete the context switch, the second processor core 315B may be adapted to retrieve the process state 220 of the task from the shared register file 305. Because the second processor core 315B retrieves the process state 220 from the shared register file 305, the overhead caused by copying the process state 220 between the individual register files 205 can be eliminated or reduced.

In some embodiments, two or more of the processor cores 315 may have a different interface to the shared register file 305. For example, a heavily out-of-order processor core may utilize a large number of registers, while an in-order processor core may utilize fewer registers. In order to address the different interfaces of the processor cores 315, the multi-core processor 300 may utilize a register renaming table (not shown). In particular, the register renaming table may specify the active registers when a context switch occurs. Through the register renaming table, the shared register file 305 can power off (or disable) registers that are not utilized by the processor core 315 or power on (or enable) registers that are utilized by the processor core 315. Register renaming may be resolved on a context switch such that a processor core that begins execution is aware of the location of the active registers. This can be accomplished in a number of ways and may depend on whether the register renaming table is internal or external to the processor cores 315. In one illustrative implementation, a register renaming table can be configured external to the processor cores 315, and simpler processor cores may utilize the information contained in the register renaming table as provided at the time of the context switch. In another illustrative implementation, a register renaming table can be configured internal to each of the processor cores 315, and thus, can be private to each of the processor cores 315. In this case, the registers can be "un-renamed" during a context switch, i.e., can be wrapped back to the registers' canonical locations, such that execution can begin with any of the processor cores 315 without any renaming. The simpler processor cores can power off (or disable) the remaining processor cores in the shared register file 305. These operations may also be performed in parallel with at least a portion of the context switch in order to reduce overhead.

When a single shared register file 305 is provided for each of the processor cores 315, one of the processor cores 315 can be utilized at any given time. Such an implementation may be suitable when the processor cores 315 have different sizes. For example, when processor cores of different sizes execute a task, the processor core having the smallest size capable of executing the task may be utilized. Because larger processor cores may consume more energy than smaller processor cores, utilizing the smallest processor core capable of executing the task may yield an energy savings.

Although the shared register file 305 may be suitable when the processor cores 315 have different sizes, the shared register file 305 may not be suitable when the processor cores 315 have different types. For example, the first processor core 315A may be an application-specific processor core configured to handle graphics processing, and the second processor core 315B may be an application-specific processor core configured to handle communications processing. The shared register file 305 may be configured to permit one of the application-specific processor cores to operate at a given time (i.e., one of the application-specific processor cores is active). As such, if a task includes a graphics part and a communications part, only one part may be handled at a given time. However, operating both application-specific processor cores in parallel may enable both parts to be handled at the same time, thereby yielding performance gains.

Figure 4:
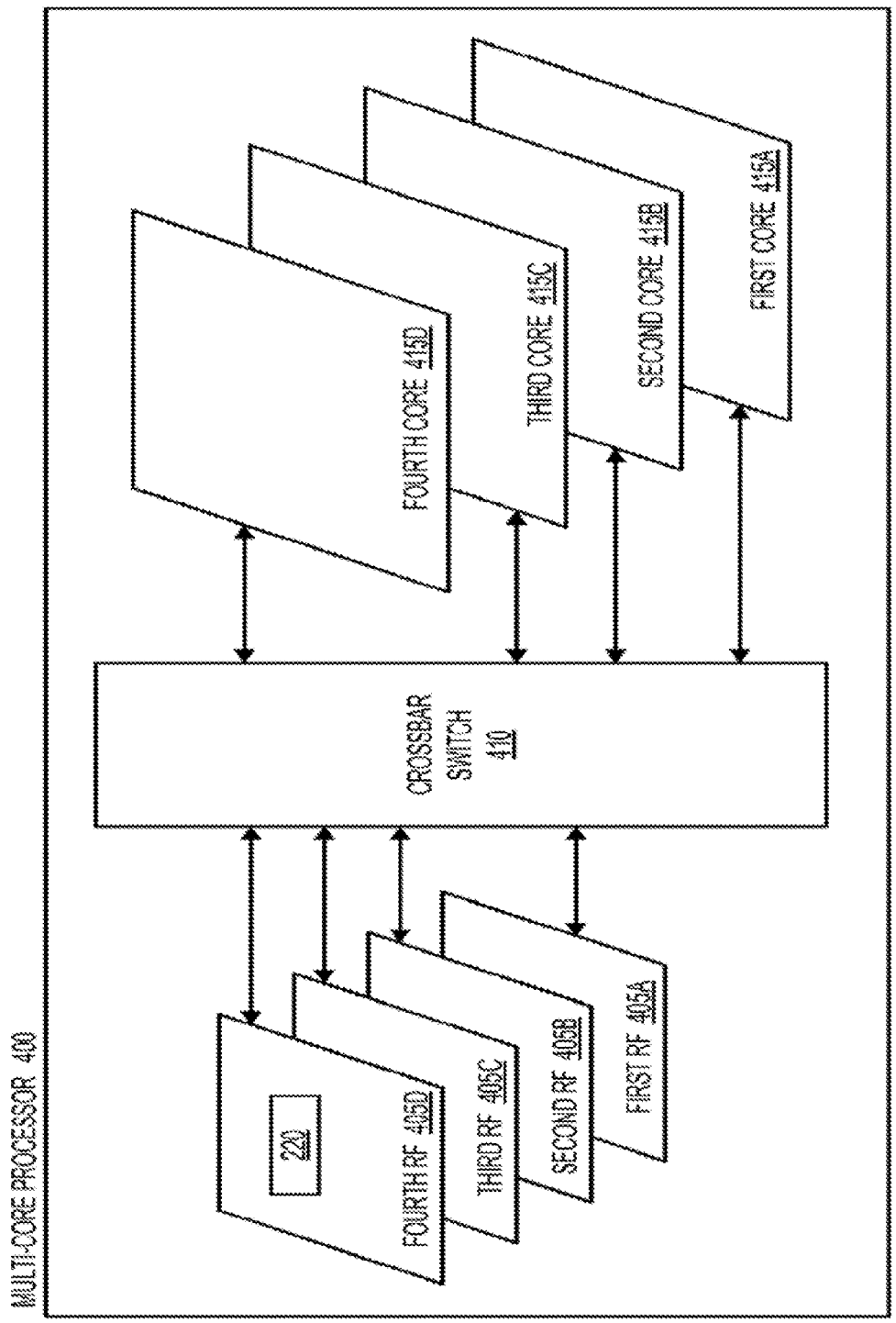
FIG. 4 is a block diagram illustrating the multi-core processor having multiple shared register files.

Turning now to FIG. 4, a block diagram illustrates the multi-core processor 400 having multiple shared register files 405 arranged in accordance with at least some embodiments presented herein. The example multi-core processor 400 includes a first processor core 415A, a second processor core 415B, a third processor core 415C, and a fourth processor core 415D. The processor cores 415A-415D may be referred to collectively, or generally, as processor cores 415. The first processor core 415A may have a larger die-area, higher throughput, and/or higher power consumption than the second processor core 415B. The second processor core 415B may have a larger die-area, higher throughput, and/or higher power consumption than the third processor core 415C. The third processor core 415C may have a larger die-area, higher throughput, and/or higher power consumption than the fourth processor core 415D. In other embodiments, two or more of the processor cores 415 may be the same size. In yet other embodiments, two or more of the processor cores 415 may be different types.

The example multi-core processor 400 further includes a first shared register file 405A, a second shared register file 405B, a third shared register file 405C, and a fourth shared register file 405D. The shared register files 405A-405D may be collectively, or generally, referred to as shared register files 405. The shared register files 405 may be coupled to the processor cores 415 via a crossbar switch 410 or other suitable multiplexer. The crossbar switch 410 may be configured to multiplex the shared register files 405 and the processor cores 415. The crossbar switch 410 may enable each of the processor cores 415 to access any one of the shared register files 405. Although the multi-core processor 400 illustrated in FIG. 4 includes the same number of register files 405 and processor cores 415, it should be appreciated that the number of shared register files 405 may be different than the number of processor cores 415.

By implementing multiple shared register files 405, two or more of the processor cores 415 can be utilized in parallel. Such an implementation may be suitable when the processor cores 415 have different types. For example, a task may contain a graphics part and a communications part. If the first processor core 415A is a graphics processing unit and the second processor core 415B is a communications processing unit, the first processor core 415A and the second processor core 415B can be configured to operate in parallel through the use of two of the register files 405 in order to concurrently complete the graphics part and the communications part. The two register files may also share the process state 220 of the task. Thus, when the first processor core 415A and the second processor core 415B undergo a context switch, the first processor core 415A and the second processor core 415B may be configured to each retrieve the process state 220 from the corresponding register file.

Figure 5:
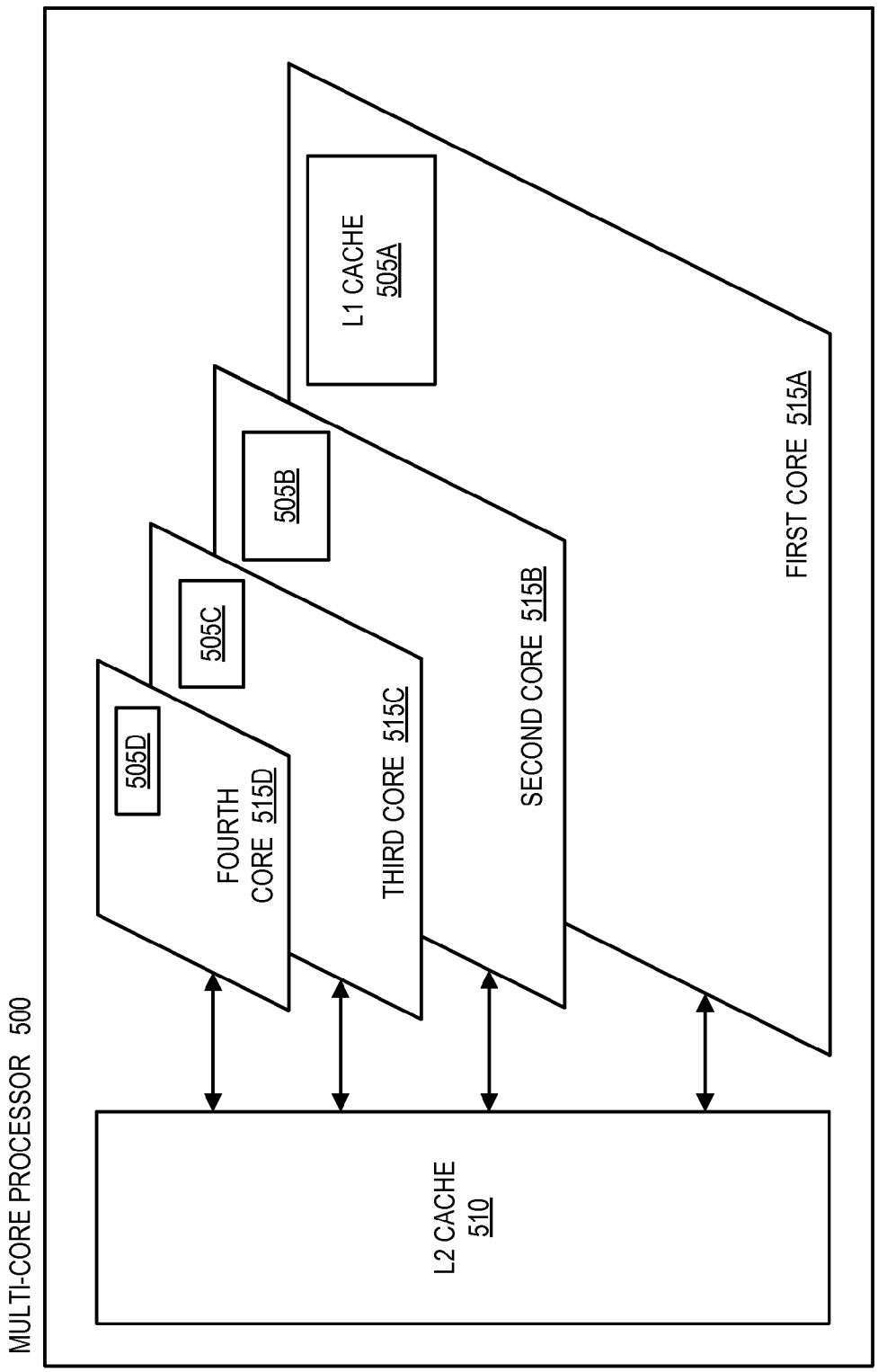
FIG. 5 is a block diagram illustrating the multi-core processor having L1 caches and a shared L2 cache.

Turning now to FIG. 5, a block diagram illustrates an example multi-core processor 500 having L1 caches 505 and a shared L2 cache 510 arranged in accordance with at least some embodiments presented herein. A first processor core 515A includes a corresponding first cache 505A that provides suitable cache functionality to the first processor core 515A. A second processor core 515B includes a corresponding second cache 505B that provides suitable cache functionality to the second processor core 515B. A third processor core 515C includes a corresponding third cache 505C that provides suitable cache functionality to the third processor core 515C. A fourth processor core 515D includes a corresponding fourth cache 505D that provides suitable cache functionality to the fourth processor core 515D. The processor cores 515A-515B may be referred to collectively, or generally, as processor cores 515. The caches 505A-505D may be referred to collectively, or generally, as caches 505.

During a context switch, one of the processor cores 515 may be adapted to flush its corresponding L1 cache 505. In a cache flush, the processor core 515 writes data from the corresponding L1 cache 505 to the main memory 120. In order to reduce or eliminate the overhead caused by the cache flush, in some embodiments, the L1 caches 505 may be implemented as a write-through cache. In a write-through cache, data is written to the main memory 120 at substantially the same time the data is written to the cache 505, thereby rendering the cache flush unnecessary during a context switch. The L1 caches 505 may also implement a snoopy cache coherence protocol to invalidate, as necessary, cache blocks in other L1 caches 505 when the data is written to the main memory 120.

The shared L2 cache 510 can be adapted to be shared between the caches 505. When the processor cores 515 utilize the shared register file 305, one of the processor cores 515 may be active at any given time. As such, the shared L2 cache 510 may be appropriate when the processor cores 515 utilize the shared register file 305.

However, when the processor cores 515 utilize the multiple shared register files 405, the single shared L2 cache 510 may not be suitable. In particular, the size of shared L2 cache 510 may be configured sufficiently large to support the possibility that multiple processor cores 515 are concurrently active. Further, the L2 cache 510 may be configured with additional ports in order to enable two or more of the processor cores 515 to be concurrently active. These ports may include read and write ports. The same or a different number of read and write ports may be utilized. These ports may enlarge the size of the single shared L2 cache 510.

Figure 6:
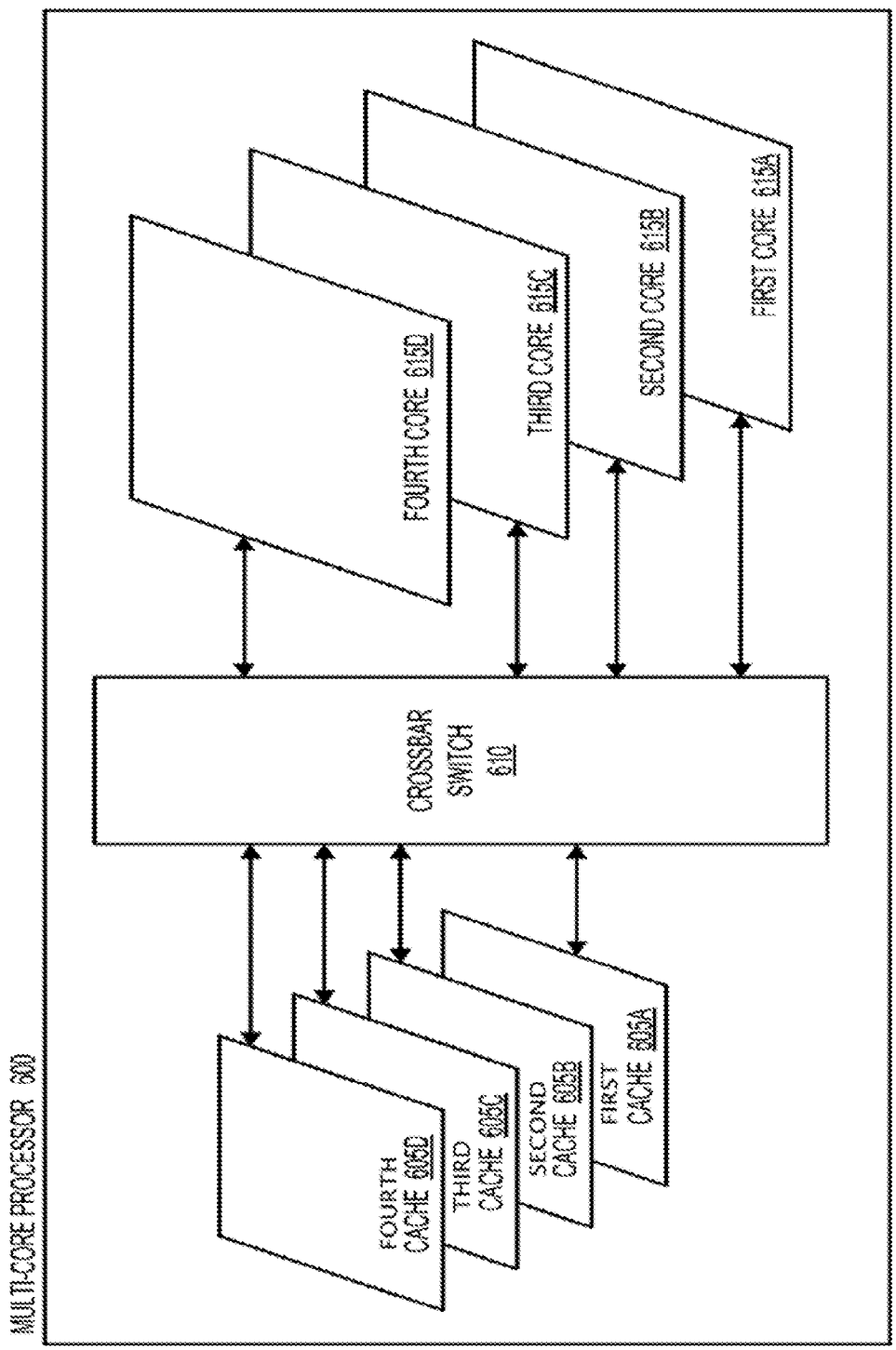
FIG. 6 is a block diagram illustrating the multi-core processor having multiple shared caches.

Turning now to FIG. 6, a block diagram illustrates an example multi-core processor 600 having multiple shared caches 605 in accordance with some embodiments presented herein. The example multi-core processor 600 includes a first processor core 615A, a second processor core 615B, a third processor core 615C, and a fourth processor core 615D. The processor cores 615A-615D may be referred to collectively, or generally, as processor cores 615.

The multi-core processor 600 further includes a first shared cache 605A, a second shared cache 605B, a third shared cache 605C, and a fourth shared cache 605D. The shared caches 605A-605D may be referred to collectively, or generally, as shared caches 605. The shared caches 605 may be coupled to the processor cores 615 via a crossbar switch 610 or other suitable multiplexer. The crossbar switch 610 may be arranged to multiplex the shared caches 605 and the processor cores 615. The crossbar switch 610 may be arranged to enable each of the processor cores 615 to access any one of the shared caches 605. Although the example multi-core processor 600 illustrated in FIG. 6 includes the same number of caches 605 and processor cores 615, it should be appreciated that the number of caches 605 may be different than the number of processor cores 615.

In some embodiments, the multiple shared caches 605 can be shared L2 caches. When the processor cores 615 utilize the shared register files 405, two or more of the processor cores 615 may be concurrently active. By multiplexing multiple L2 caches with the processor cores 615, when two or more of the processor cores 615, the processor cores 615 may utilize two or more of the L2 caches. Because multiple L2 caches are provided, the size of each of the L2 caches can be remain smaller than if the single shared L2 cache 510 was provided.

In other embodiments, the multiple shared caches 605 can be shared L1 caches. During a context switch, the processor core 615 core may flush its corresponding L1 cache. By sharing the L1 caches, the cache flush may become unnecessary because a processor core 615 may be arranged to select an available L1 cache through the multiplexer when the current L1 cache has yet to be flushed. However, the multiplexer may add additional complexity to the multi-core processor 600. Further, because the L1 caches may potentially be utilized by any one of the processor cores 615, the L1 caches may be configured such that the size of the smallest L1 cache in the L1 caches is sufficiently large to provide good cache performance to the largest processor core in the processor cores 615.

When the processor cores 615 are application-specific processor cores, some application-specific processor cores may have specific requirements for their associated L1 caches. These requirements may specify L1 cache sizes and/or cache configurations. If the application-specific processor cores have specific requirements, the L1 caches may be adjusted, as necessary, by powering off rows in the L1 caches or by power off columns in the L1 caches. In particular, by powering off (or disabling) rows in the L1 caches, the L1 caches can reduce their associativity, and by powering off (or disabling) columns in the L1 caches, the L1 caches can reduce their size.

Figure 7:
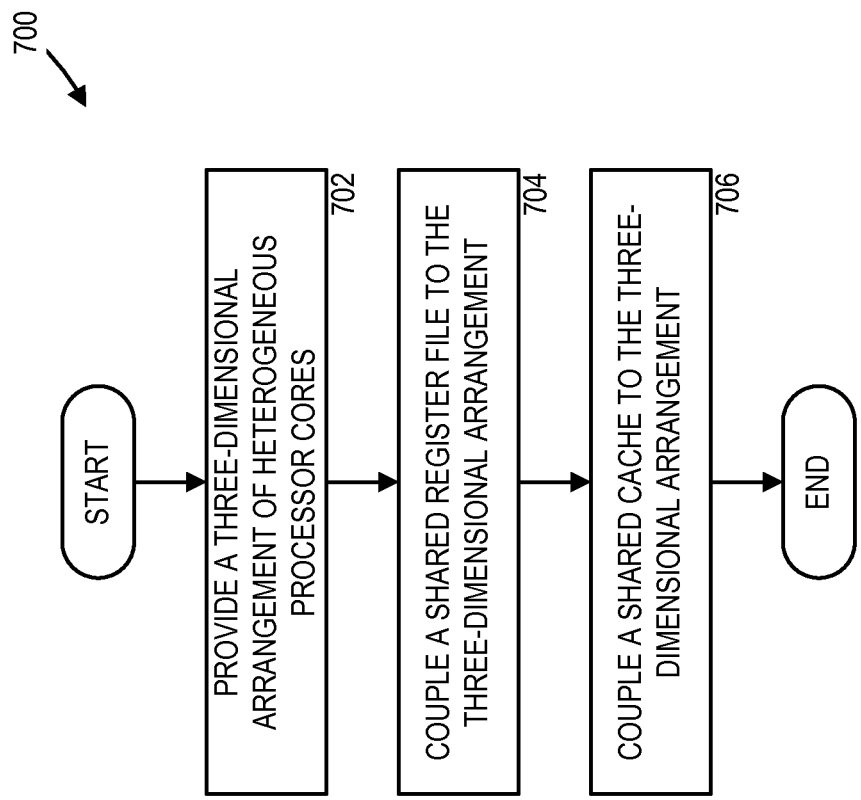
FIG. 7 is a flow diagram illustrating a process for generating a multi-core processor having a shared register and a shared cache.

Turning now to FIG. 7, a flow diagram illustrates a process 700 for generating a multi-core processor in accordance with at least some embodiments described herein. The process 700 includes various operations, functions, or actions as illustrated by one or more of blocks 702, 704, and/or 706. The process 700 may begin at block 702 (Provide Three-Dimensional Arrangement), where a manufacturer may provide a three-dimensional arrangement of heterogeneous processor cores, such as the processor cores 315. The three-dimensional arrangement may include a plurality of layers. Each of the layers may include one of the heterogeneous processor cores. The heterogeneous processor cores may have different sizes and/or different types. Block 702 may be followed by block 704.

At block 704 (Couple to Shared Register File), the manufacturer may couple a shared register file, such as the shared register file 305, to the three-dimensional arrangement of heterogeneous processor cores. The shared register file may replace individual register files that may be embedded within the processor cores. Block 704 may be followed by block 706.

At block 706 (Couple to Shared Cache), the manufacturer may couple a shared cache, such as the shared cache L2 cache 510, to the three-dimensional arrangement of heterogeneous processor cores. The shared cache may be an L1 cache, an L2 cache, and/or some other suitable cache. After block 706, the process 700 may either repeat (e.g., periodically, continuously, or on demand as needed) or terminate.

Figure 8:
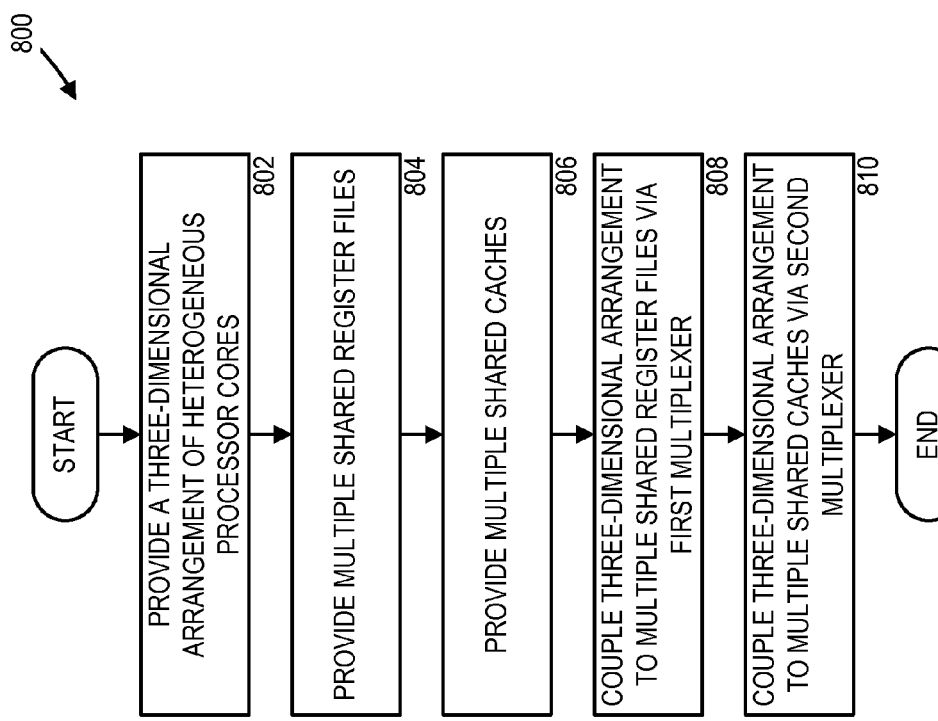
FIG. 8 is a flow diagram illustrating a process for generating a multi-core processor having multiple shared registers and multiple shared caches.

Turning now to FIG. 8, a flow diagram illustrates a process 800 for generating a multi-core processor in accordance with at least some embodiments described herein. The process 800 includes various operations, functions, or actions as illustrated by one or more of blocks 802, 704, 806, 808 and/or 810. The process 800 may begin at block 802 (Provide Three-Dimensional Arrangement), where a manufacturer may provide a three-dimensional arrangement of heterogeneous processor cores, such as the processor cores 315. The three-dimensional arrangement may include a plurality of layers. Each of the layers may include one of the heterogeneous processor cores. The heterogeneous processor cores may have different sizes and/or different types. Block 802 may be followed by block 804.

At block 804 (Provide Multiple Shared Register Files), the manufacturer may provide multiple shared register files, such as the shared register files 405. The multiple shared register files may replace individual register files that may be embedded within the processor cores. Block 804 may be followed by block 806.

At block 806 (Provide Multiple Shared Caches), the manufacturer may provide multiple shared caches, such as the shared caches 605. The shared cache may be an L1 cache, an L2 cache, and/or some other suitable cache. Block 806 may be followed by block 808.

At block 808 (Couple Three-Dimensional Arrangement to Shared Register Files), the manufacturer may couple the shared register files to the three-dimensional arrangement of heterogeneous processor cores via a first multiplexer. An example of the first multiplexer is crossbar switch 410. Block 808 may be followed by block 810.

At block 810 (Couple Three-Dimensional Arrangement to Shared Caches), the manufacturer may couple the shared caches to the three-dimensional arrangement of heterogeneous processor cores via a second multiplexer. An example of the second multiplexer is the crossbar switch 610. After block 810, the process 800 may either repeat (e.g., periodically, continuously, or on demand as needed) or terminate.

Figure 9:
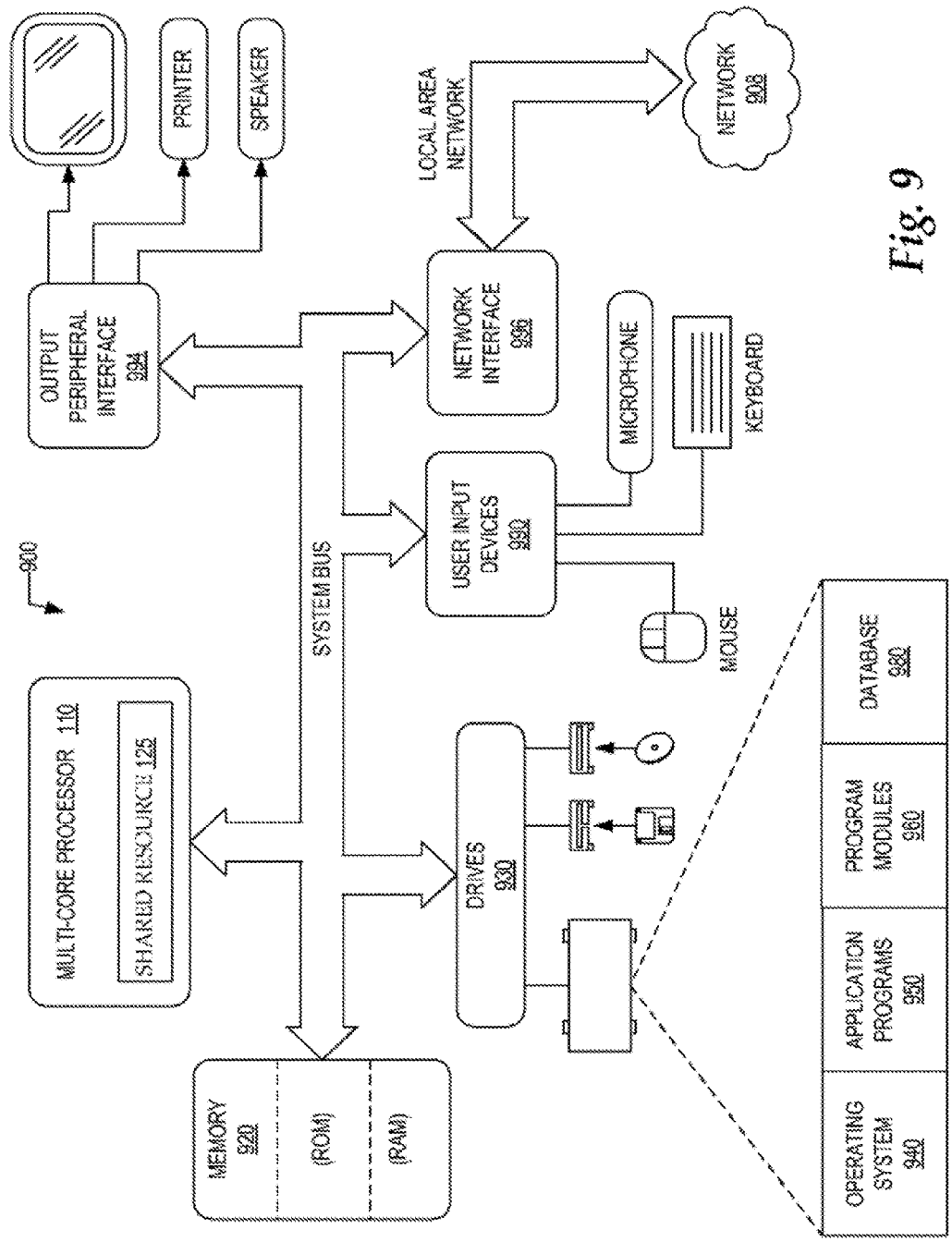
FIG. 9 is a block diagram illustrating an example computing system, all arranged according to at least some embodiments presented herein.

FIG. 9 is a computer architecture diagram showing an illustrative computer hardware architecture for a computing system capable of implementing at least some embodiments presented herein. FIG. 9 includes a computer 900, including the multi-core processor 110, memory 920 and one or more drives 930. The computer 900 may be implemented as a conventional computer system, an embedded control computer, a laptop, or a server computer, a mobile device, a set-top box, a kiosk, a vehicular information system, a mobile telephone, a customized machine, or other hardware platform. The multi-core processor 110 may be a homogenous multi-core processor or a heterogeneous multi-core processor. A homogeneous multi-core processor may be appropriate because even though homogeneous processor cores may have identical functionality and logical structure, homogeneous processor cores may have significantly different timing, energy, and other characteristics. Further, homogenous processor cores may provide better thermal management and reduced power leakage over heterogeneous processor cores. The multi-core processor 110 may include the shared resource 125, which can be shared by the processor cores within the multi-core processor 110. Examples of the multi-core processor 110 may include the multi-core processor 300, the multi-core processor 400, the multi-core processor 500, and the multi-core processor 600 illustrated in FIGS. 3-6, respectively.

The drives 930 and their associated computer storage media, provide storage of computer readable instructions, data structures, program modules and other data for the computer 900. The drives 930 can include an operating system 940, application programs 950, program modules 960, and a database 980. The computer 900 further includes user input devices 990 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to a multi-core processor 110 through a user input interface that is coupled to a system bus, but may be coupled by other interface and bus structures, such as a parallel port, game port or a universal serial bus ("USB"). Computers such as the computer 900 may also include other peripheral output devices such as speakers, which may be coupled through an output peripheral interface 994 or the like.

The computer 900 may operate in a networked environment using logical connections to one or more computers, such as a remote computer coupled to a network interface 996. The remote computer may be a personal computer, a server, a router, a network PC, a peer device or other common network node, and can include many or all of the elements described above relative to the computer 900. Networking environments are commonplace in offices, enterprise-wide area networks ("WAN"), local area networks ("LAN"), intranets and the Internet.

When used in a LAN or WLAN networking environment, the computer 900 may be coupled to the LAN through the network interface 996 or an adapter. When used in a WAN networking environment, the computer 900 typically includes a modem or other means for establishing communications over the WAN, such as the Internet or the network 908. The WAN may include the Internet, the illustrated network 908, various other networks, or any combination thereof. It will be appreciated that other mechanisms of establishing a communications link, ring, mesh, bus, cloud, or network between the computers may be used.

According to some embodiments, the computer 900 may be coupled to a networking environment. The computer 900 may include one or more instances of a physical computer-readable storage medium or media associated with the drives 930 or other storage devices. The system bus may enable the multi-core processor 110 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 920, whether characterized as RAM, ROM, flash, or other types of volatile or nonvolatile memory technology. The media may also represent secondary storage, whether implemented as the storage drives 930 or otherwise. Hard drive implementations may be characterized as solid state, or may include rotating media storing magnetically-encoded information.

The storage media may include one or more program modules 960. The program modules 960 may include software instructions that, when loaded into the multi-core processor 110 and executed, transform a general-purpose computing system into a special-purpose computing system. As detailed throughout this description, the program modules 960 may provide various tools or techniques by which the computer 900 may participate within the overall systems or operating environments using the components, logic flows, and/or data structures discussed herein.

The multi-core processor 110 may be constructed from any number of transistors or other circuit elements, which may individually or collectively assume any number of states. More specifically, the multi-core processor 110 may operate as a state machine or finite-state machine. Such a machine may be transformed to a second machine, or specific machine by loading executable instructions contained within the program modules 960. These computer-executable instructions may transform the multi-core processor 110 by specifying how the multi-core processor 110 transitions between states, thereby transforming the transistors or other circuit elements constituting the multi-core processor 110 from a first machine to a second machine. The states of either machine may also be transformed by receiving input from the one or more user input devices 990, the network interface 996, other peripherals, other interfaces, or one or more users or other actors. Either machine may also transform states, or various physical characteristics of various output devices such as printers, speakers, video displays, or otherwise.

Encoding the program modules 960 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 960 may transform the physical state of the semiconductor memory 920 when the software is encoded therein. For example, the software may transform the state of transistors, capacitors, or other discrete circuit elements constituting the semiconductor memory 920.

As another example, the storage media may be implemented using magnetic or optical technology such as drives 930. In such implementations, the program modules 960 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A multi-core processor adapted to share processor resources, comprising:
    a plurality of processor cores, including first, second, third, and fourth processor cores, configured in a three-dimensional arrangement on a single integrated circuit that includes a plurality of layers, the first, second, third, and fourth processor cores being located on respective first, second, third, and fourth layers of the plurality of layers;
    a plurality of shared register files, including first, second, third, and fourth shared registers files configured in another three-dimensional arrangement on the single integrated circuit, the shared register files selectively coupled to the plurality of processor cores that are located on the first, the second, the third, and the fourth layers, wherein:
        a number of the plurality of shared register files is different than a number of the plurality of processor cores;
        the first processor core has a larger top surface die area than the second processor core;
        the second processor core has a larger top surface die area than the third processor core, and the second layer is located above the first layer;
        the third processor core has a larger top surface die area than the fourth processor core, and the third layer is located above the second layer;
        the fourth layer is located above the third layer;
        the first processor core is configured as a graphics processor unit, and the second processor core is configured as a communications processor unit;
        the first processor core and the second processor core are configured to operate in parallel through their respective use of the first and second register files in order to concurrently complete a graphics part by the first processor core, and a communications part by the second processor core, of a task being executed by the first and second processor cores;
        the first and second register files are configured to store and share a process state of the task, so that when the first processor core and the second processor core undergo a context switch, the first processor core and the second processor core are configured to respectively retrieve the process state from the first and second register files;
        each of the plurality of processor cores comprises an associated L1 cache; and
        the associated L1 cache comprises a write-through cache; and
    a crossbar switch configured to selectively couple any one of the plurality of processor cores to any one of the plurality of shared register files.

2. The multi-core processor of claim 1, wherein the plurality of processor cores comprises a plurality of heterogeneous processor cores, wherein at least two of the heterogeneous processor cores differ in at least one of complexity, throughput, power consumption, clock frequency, power state, voltage level, general or application-specific design.

3. The multi-core processor of claim 1, wherein each of the plurality of processor cores comprises an associated cache.

4. The multi-core processor of claim 1, further comprising:
    a shared cache coupled to the two or more of the plurality of processor cores that are on different layers.

5. The multi-core processor of claim 1, further comprising a register renaming table that specifies which registers in the plurality of shared register file are active registers for each processor core.

6. The multi-core processor of claim 1, further comprising a plurality of shared caches coupled to the plurality of processor cores, wherein a number of the plurality of shared caches is different than a number of the plurality of processor cores.

7. A multi-core processor adapted to share processor resources, comprising:
    a plurality of processor cores, including first and second processor cores, arranged in a corresponding plurality of layers on a single integrated circuit, at least one of the layers having a different sized top surface die area;
    a plurality of shared register files, including first and second register files, arranged in a three-dimensional arrangement on the single integrated circuit;
    a first multiplexer configured to selectively couple two or more of the plurality of processor cores that are located on different layers to a any one of the plurality of shared register files;
    a plurality of shared caches coupled to the plurality of processor cores; and
    a second multiplexer adapted to selectively couple two or more of the plurality of shared caches to a corresponding one of the plurality of processor cores that is located on any one of the plurality of layers, wherein:
        each of the shared caches comprises an L2 cache, and wherein each of the plurality of processor cores comprises an associated L1 cache;
        the associated L1 cache comprises a write-through cache;
        each shared cache is configured to reduce size by powering off one or more rows of the shared cache and to reduce associativity by powering off one or more columns of the shared cache;
        each shared register file is configured to power off and power on one or more registers in the shared register file;
        the first processor core is configured as a graphics processor unit, and the second processor core is configured as a communications processor unit;
        the first processor core and the second processor core are configured to operate in parallel through their respective use of the first and second register files in order to concurrently complete a graphics part by the first processor core, and a communications part by the second processor core, of a task being executed by the first and second processor cores;
        the first and second register files are configured to store and share a process state of the task, so that when the first processor core and the second processor core undergo a context switch, the first processor core and the second processor core are configured to respectively retrieve the process state from the first and second register files.

8. The multi-core processor of claim 7, wherein the plurality of processor cores comprises a plurality of heterogeneous processor cores, wherein at least two of the heterogeneous processor cores differ in at least one of: complexity, throughput, power consumption, clock frequency, power state, voltage level, general or application-specific design.

9. The multi-core processor of claim 8, wherein the two or more of the plurality of heterogeneous processor cores comprise different application-specific processor cores.

10. The multi-core processor of claim 8, wherein two or more of the plurality of the heterogeneous processor cores comprise processor cores having a different throughput and/or different power consumption characteristics.

11. The multi-core processor of claim 7, further comprising a register renaming table that specifies which registers in the plurality of shared register files are active registers for each processor core.

12. A heterogeneous multi-core processor adapted to share processor resources, comprising:
   a plurality of heterogeneous processor cores, including first and second heterogeneous processor cores, configured in a three-dimensional arrangement, the three-dimensional arrangement comprising a plurality of layers that includes a top layer, a middle layer and a bottom layer on a single integrated circuit, each of the plurality layers comprising one or more of the plurality of heterogeneous processor cores, each layer having a smaller top surface die area than the layer below it, wherein at least two of the heterogeneous processor cores differ in at least one of: size, speed, complexity, throughput, power consumption, clock frequency, power state, voltage level, general or application-specific design;
   a shared register file located in the middle layer and coupled to the plurality of heterogeneous processor cores, and wherein location of the shared register file in the middle layer reduces a distance between the shared register file and heterogeneous processor cores in the top and bottom layers, so as to increase speed of task execution; and
   a shared cache coupled to the plurality of heterogeneous processor cores, wherein:
      the shared cache comprises an L2 cache, and wherein each of the plurality of heterogeneous processor cores comprises an associated L1 cache;
      the associated L1 cache comprises a write-through cache;
      the shared cache is configured to reduce size by powering off one or more rows of the shared cache and to reduce associativity by powering off one or more columns of the shared cache;
      the shared register file is configured to power off and power on one or more registers in the shared register file;
      relatively more active heterogeneous processor cores of the plurality of heterogeneous processor cores are located next to the shared register file, so as to provide for reduced energy consumption;
      relatively larger and faster heterogeneous processor cores of the plurality of heterogeneous processor cores are located nearer to the shared register file, so as to increase speed of task execution;
      the shared register file is configured to store a process state of a task being executed by the plurality of heterogeneous processor cores;
      the plurality of heterogeneous processor cores are configured to share the process state in the shared register file without copying the process state between individual register files, so that when the first heterogeneous processor core completes execution of operations associated with the task and transfers the task to the second heterogeneous processor core for execution, the second heterogeneous processor core is configured to undergo a context switch to transition from a current task to the transferred task;
      to complete the context switch, the second heterogeneous processor core is configured to retrieve the process state from the shared register file, so as to eliminate or reduce overhead caused by copying process states between individual register files; and
      the first and second heterogeneous processor cores are relatively smaller in size compared to other heterogeneous processor cores of the plurality of heterogeneous processor cores, such that the task is executed by at least one heterogeneous processor core of the plurality of heterogeneous processor cores having a smallest size capable to execute the task.

13. The heterogeneous multi-core processor of claim 12, wherein the associated L1 cache is configured to operate with a snoopy cache coherence protocol configured to invalidate one or more cache blocks in the associated L1 cache.

14. The heterogeneous multi-core processor of claim 12, further comprising a register renaming table that specifies which registers in the shared register file are active registers for each processor core.

* * * * *